(12) United States Patent
Bruder et al.

(10) Patent No.: US 7,238,944 B2
(45) Date of Patent: Jul. 3, 2007

(54) DETECTOR FOR X-RAY COMPUTER TOMOGRAPHY SCANNERS

(75) Inventors: Herbert Bruder, Höchstadt (DE); Thomas Flohr, Ühlfeld (DE); Karl Stierstorfer, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 255 days.

(21) Appl. No.: 10/507,896

(22) PCT Filed: Mar. 7, 2003

(86) PCT No.: PCT/DE03/00739

§ 371 (c)(1),
(2), (4) Date: Sep. 17, 2004

(87) PCT Pub. No.: WO03/079372

PCT Pub. Date: Sep. 25, 2003

(65) Prior Publication Data

US 2005/0167601 A1    Aug. 4, 2005

(30) Foreign Application Priority Data

Mar. 18, 2002    (DE) .............................. 102 11 948

(51) Int. Cl.
*G01T 1/20*    (2006.01)
(52) U.S. Cl. .................................................. 250/367
(58) Field of Classification Search ............... 250/367
See application file for complete search history.

(56) References Cited

U.S. PATENT DOCUMENTS

| | | | |
|---|---|---|---|
| 4,644,578 A | 2/1987 | Paolini | |
| 5,043,583 A * | 8/1991 | Robinson | 250/397 |
| 5,666,395 A | 9/1997 | Tsukamoto et al. | |
| 6,272,207 B1 | 8/2001 | Tang | |
| 6,361,735 B1 | 3/2002 | Venkataramani et al. | |
| 2001/0011709 A1 | 8/2001 | Riedner et al. | |
| 2003/0026386 A1* | 2/2003 | Tang et al. | 378/154 |
| 2004/0178347 A1* | 9/2004 | Murayama et al. | 250/367 |

FOREIGN PATENT DOCUMENTS

| | | |
|---|---|---|
| DE | 195 02 574 A1 | 8/1996 |
| DE | 197 09 690 A1 | 9/1998 |
| DE | 100 42 608 A1 | 3/2001 |

* cited by examiner

*Primary Examiner*—David Porta
*Assistant Examiner*—Christopher Webb
(74) *Attorney, Agent, or Firm*—Harness, Dickey & Pierce, P.L.C.

(57) ABSTRACT

A detector for x-ray computer tomography scanners, includes a number of adjacent detector lines extending in an x direction, whereby each detector line is formed from a multitude of adjacent scintillator elements. In order to increase the resolution in the z direction and to simplify the design of the detector, the surface of the scintillator elements are partially covered, which further serves to reduce the size of the aperture in the z direction.

19 Claims, 2 Drawing Sheets

DETECTOR FOR X-RAY COMPUTER TOMOGRAPHY SCANNERS

This application is the national phase under 35 U.S.C. § 371 of PCT International Application No. PCT/DE03/00739 which has an International filing date of Mar. 7, 2003, which designated the United States of America and which claims priority on German Patent Application number DE 102 11 948.1 filed Mar. 18, 2002, the entire contents of which are hereby incorporated herein by reference.

FIELD OF THE INVENTION

The invention generally relates to an x-ray computer tomography scanner comprising a detector.

BACKGROUND OF THE INVENTION

A computer tomography scanner that includes a detector is known, for example, from DE 195 02 574 A1. The detector of the known x-ray computer tomography scanner is a so-called multi-line detector. It includes a plurality of detector lines that are arranged in the direction of the axis of an object that is to be irradiated, for example, a patient. The aforementioned axis is also referred to as the z axis. In an x direction running perpendicular to the z axis, each detector line consists of a plurality of adjacent scintillator elements.

In the z direction, the resolution of such a multi-line detector is a function of the height of the scintillator elements in the z direction. For technical reasons, the height of the scintillator elements cannot be reduced at will. For this reason the resolution of conventional multi-line detectors in the z direction is limited.

SUMMARY OF THE INVENTION

An object of an embodiment of the invention is to reduce or even eliminate at least one of the disadvantages according to the prior art. In particular, one aim, in one embodiment, is to disclose an x-ray computer tomography scanner including a detector that is as simple as possible and inexpensive to produce, with which an increased resolution is possible in the z direction where there is a set number or height of lines.

According to an embodiment of the invention, a device that partially covers the surface of the scintillator elements is provided, which partially covers the surface of the scintillator elements, for reducing the size of the aperture in the z direction. The step that is suggested allows an increase in the resolution in the z direction, in a simple and inexpensive manner. The proposed solution is universal. Conventional scintillator elements can be used. Retroactive conversion of conventional multi-line detectors is also possible.

Usefully, the device for reducing the size of the aperture is formed from a plurality of parallel adjacent strips, the strips advantageously covering the edges of the scintillator elements that run in the x direction. The proposed features also make it possible to use scintillator elements, the edges whereof have smaller openings in the x direction.

According to a further embodiment, the strips are arranged a predetermined distance $\Delta z$ apart in the z direction, such that the scintillator elements essentially have the same aperture in the z direction. This makes the manufacture of the detector simpler. Furthermore, the device for reducing the size of the aperture can include transverse strips which cover the edges of the scintillator elements that run in the z direction. Thus the aperture can be reduced in size in the x direction, too. In this case, the edges of the scintillator elements that extend in the z direction no longer have to be of the quality required by the prior art.

The device for reducing the size of the aperture is advantageously formed in one piece in the manner of a surround that is attachable to the detector surface that is formed by the scintillator surfaces. This makes the retroactive conversion of conventional multi-line detectors possible. The surround is designed to be symmetrical with respect to a plane of symmetry that runs perpendicular to the z direction.

According to an advantageous embodiment, the device for reducing the size of the aperture is manufactured from a metal that absorbs X-rays effectively, preferably of lead or tungsten.

BRIEF DESCRIPTION OF THE DRAWINGS

Further advantages, features and details of the invention will become evident from the description of illustrated exemplary embodiments given hereinbelow and the accompanying drawings, which are given by way of illustration only and thus are not limitative of the present invention, wherein.

DETAILED DESCRIPTION OF THE PREFERRED EMBODIMENTS

Figure 1:
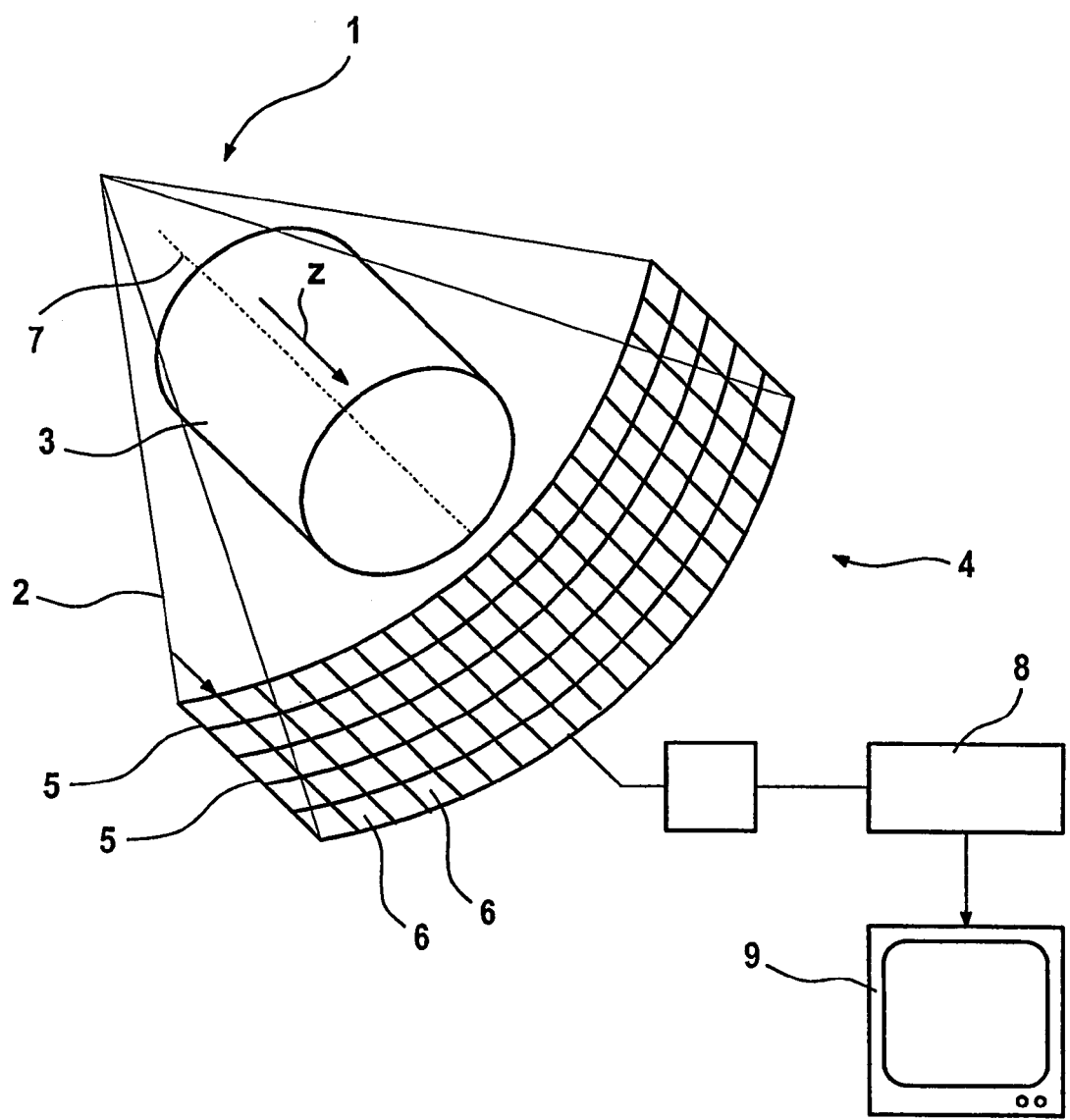
FIG. 1 A detector arrangement according to the prior art, seen in perspective.

FIG. 1 shows a focal point 1 of an x-ray beam emitter from which comes a fan-shaped beam of x-rays blended together by a surround that is not shown, which beam penetrates an object 3 and impinges on a detector 4. The detector 4 has a plurality of parallel detector lines 5, each of which is formed from a plurality of adjacent scintillator elements 6. A z axis that runs parallel to the axis of the irradiated object 3 is marked with the reference character 7. The z axis is parallel to the axis of rotation of a measuring system that includes the detector 4.

The measuring system rotates around the axis of rotation 7 such that the object 3 is x-rayed at various angles of projection. From the detector signals produced during the above process, a computer 8 calculates an image of the object 3 which is reproduced on a monitor 9.

Figure 2:
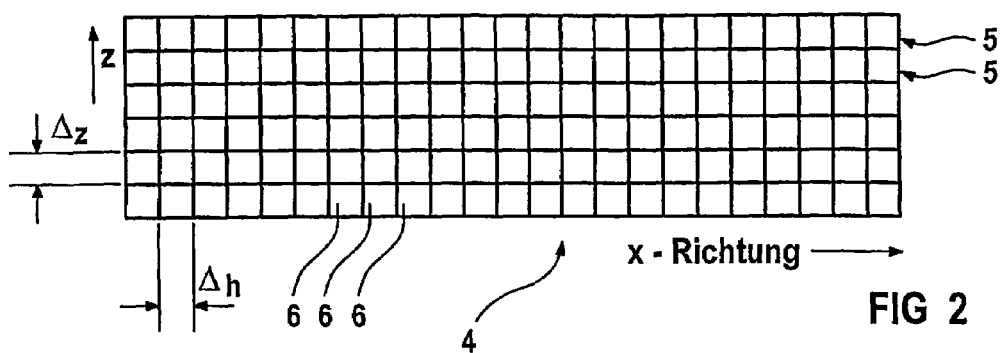
FIG. 2 a top view of a detector.

FIG. 2 shows a top view of the detector 4. The detector includes a plurality of adjacent detector lines 5 in the z direction. Each line consists of adjacent scintillator elements 6 in an x direction that runs perpendicular to the z direction. The scintillator elements 6 each have the same height $\Delta z$ and a uniform width $\Delta h$. The aperture of each of the detector elements 6 is provided by the surface, which has the height $\Delta z$ in the z direction and the width $\Delta h$ in the x direction.

Figure 3:
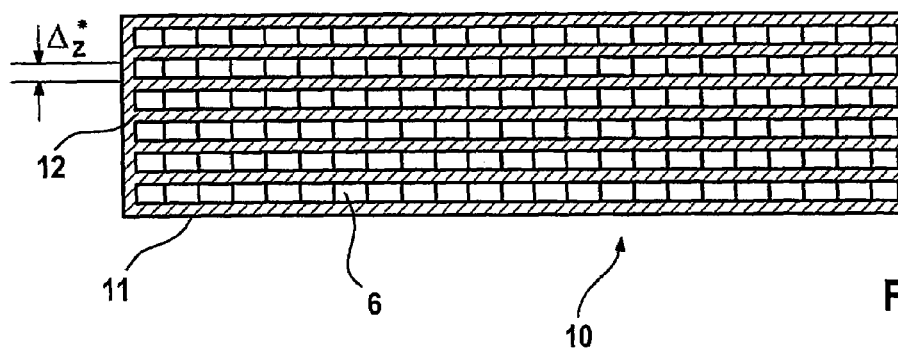
FIG. 3 the detector according to FIG. 2 with a surround according to an embodiment of the invention and FIG. 4 the detector according to FIG. 3 with a further surround according to an embodiment of the invention.

In FIG. 3 the detector surface created by all the surfaces of the detector elements 6 is partially covered by a surround 10. The surround 10 consists of strips 11 that run in the x direction, which are secured on both sides by edge strips 12 that run in the z direction. The surround 10 is usefully manufactured from lead or tungsten. The strips 10 are arranged such that the edges of the detector elements 6 that run in the x direction are covered thereby. By way of the surround 10, the aperture of the detector elements 6 can be reduced in size in the z direction in a simple manner. Fitting the surround 10 to the detector surface results in a smaller aperture Δz* in the z direction. The proposed surround 10 allows the resolution in the z direction to be improved in a simple manner.

Figure 4:
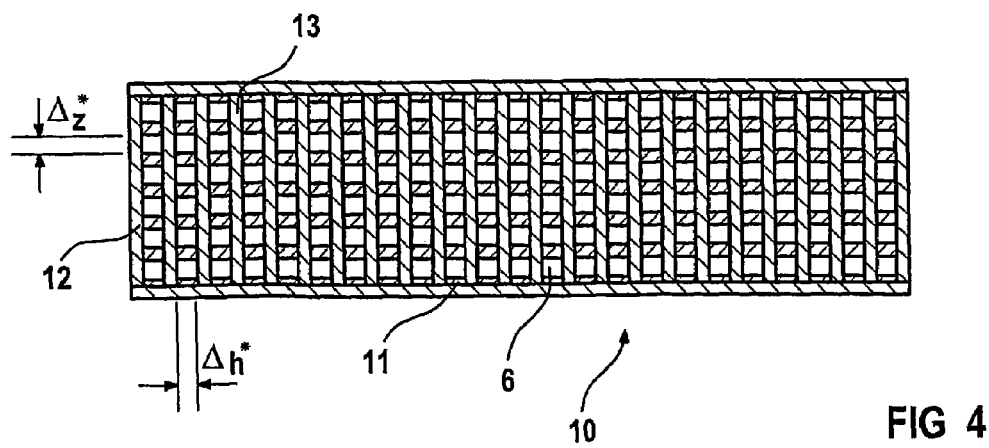

In the embodiment shown in FIG. 4, the surround 10 that is shown in FIG. 3 has additional transverse strips 13. The transverse strips 13 are fitted in such a way that the edges of the detector elements 6 are covered thereby in the z direction. The transverse strips 13 and the strips 11 form a grid. The aperture formed by the grid is rectangular in design. The proposed further surround 10 is particularly advantageous because, where the scintillator elements are of a given size, the resolution can be improved thereby in a particularly simple manner, both in the x and in the z direction. Conventional detectors can be provided with such a surround without any great expense.

Exemplary embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

The invention claimed is:

1. A detector for an X-ray computer tomography scanner, rotatable around an axis of rotation that runs parallel to a first direction, the detector comprising:
a plurality of adjacent detector lines extending in a second direction, wherein each detector line is formed from a plurality of adjacent scintillator elements and wherein an aperture of each of said scintillator elements for impinging X-rays is provided by a surface that has a length extending in the first direction and a width extending in the second direction; and
means, which partially covers the surface of the scintillator elements, for reducing the size of the aperture in the first direction, said means for reducing the size of the aperture including a plurality of parallel adjacent strips.

2. Detector according to claim 1, wherein the strips cover the edges of the scintillator elements that run in the second direction.

3. Detector according to claim 2, wherein the strips are arranged in the first direction a predetermined distance apart, such that the scintillator elements essentially have the same aperture in the first direction.

4. Detector according to claim 2, wherein the means for reducing the size of the aperture further includes transverse strips, which cover the edges of the scintillator elements that run in the first direction.

5. Detector according to claim 1, wherein the strips are arranged in the first direction a predetermined distance apart, such that the scintillator elements essentially have the same aperture in the first direction.

6. Detector according to claim 5, wherein the means for reducing the size of the aperture further includes transverse strips, which cover the edges of the scintillator elements that run in the first direction.

7. Detector according to claim 1, wherein the means for reducing the size of the aperture further includes transverse strips, which cover the edges of the scintillator elements that run in the first direction.

8. Detector according to claim 1, wherein the means for reducing the size of the aperture is formed in one piece in the manner of a surround that is attachable to the detector surface that is formed by the scintillator surfaces.

9. Detector according to claim 1, wherein the means for reducing the size of the aperture is manufactured from a metal that absorbs X-rays effectively.

10. Detector according to claim 1, wherein the means for reducing the size of the aperture is manufactured from at least one of lead and tungsten.

11. An X-ray computer tomography scanner, comprising the detector of claim 1.

12. An X-ray computer tomography scanner, comprising:
a detector, rotatable around an axis of rotation that runs parallel to a first direction, the detector including,
a plurality of adjacent detector lines extending in a second direction, wherein each detector line is formed from a plurality of adjacent scintillator elements and wherein an aperture of each of said scintillator elements for impinging X-rays is provided by a surface that has a length extending in the first direction and a width extending in the second direction; and
a plurality of parallel adjacent strips, which partially cover the surface of the scintillator elements, adapted to reduce the size of the aperture in the first direction.

13. The scanner of claim 12, wherein the strips cover the edges of the scintillator elements that run m the second direction.

14. The scanner of claim 12, wherein the strips are arranged in the first direction a predetermined distance apart, such that the scintillator elements essentially have the same aperture in the first direction.

15. The scanner of claim 12, wherein the detector further includes transverse strips, which cover the edges of the scintillator elements that run in the first direction.

16. The scanner of claim 12, wherein the plurality of parallel adjacent strips are formed in one piece in the manner of a surround that is attachable to the detector surface that is formed by the scintillator surfaces.

17. The scanner of claim 12, wherein the plurality of parallel adjacent strips is manufactured from a metal that absorbs X-rays effectively.

18. The scanner of claim 12, the plurality of parallel adjacent strips are manufactured from at least one of lead and tungsten.

19. A detector, rotatable around an axis of rotation that runs parallel to a first direction, the detector comprising:
a plurality of adjacent detector lines extending in a second direction, wherein each detector line is formed from a plurality of adjacent scintillator elements and wherein an aperture of each of said scintillator elements for impinging X-rays is provided by a surface that has a length extending in the first direction and a width extending in the second direction; and
a plurality of parallel adjacent strips, which partially cover the surface of the scintillator elements, adapted to reduce the size of the aperture in the first direction.

* * * * *